US007912715B2

(12) United States Patent
Vasilache

(10) Patent No.: US 7,912,715 B2
(45) Date of Patent: Mar. 22, 2011

(54) DETERMINING DISTORTION MEASURES IN A PATTERN RECOGNITION PROCESS

(75) Inventor: Marcel Vasilache, Tampere (FI)

(73) Assignee: Nokia Corporation, Espoo (FI)

( * ) Notice: Subject to any disclaimer, the term of this patent is extended or adjusted under 35 U.S.C. 154(b) by 1128 days.

(21) Appl. No.: 10/402,371

(22) Filed: Mar. 27, 2003

(65) Prior Publication Data

US 2004/0039573 A1    Feb. 26, 2004

(30) Foreign Application Priority Data

Mar. 27, 2002    (WO) .................... PCT/IB02/00948

(51) Int. Cl.
*G10L 15/04* (2006.01)
(52) U.S. Cl. ...................................... 704/251
(58) Field of Classification Search .............. 704/251, 704/254, 255, 256.6
See application file for complete search history.

(56) References Cited

U.S. PATENT DOCUMENTS

| | | | | |
|---|---|---|---|---|
| 4,941,178 A | * | 7/1990 | Chuang | 704/252 |
| 5,148,489 A | * | 9/1992 | Erell et al. | 704/226 |
| 5,475,792 A | * | 12/1995 | Stanford et al. | 704/233 |
| 5,515,475 A | | 5/1996 | Gupta et al. | |
| 5,933,806 A | | 8/1999 | Beyerlein et al. | |
| 6,009,390 A | * | 12/1999 | Gupta et al. | 704/240 |
| 6,070,140 A | * | 5/2000 | Tran | 704/275 |
| 6,161,091 A | * | 12/2000 | Akamine et al. | 704/258 |
| 6,195,639 B1 | | 2/2001 | Feltstrom et al. | |

FOREIGN PATENT DOCUMENTS

EP    0903728    3/1999

OTHER PUBLICATIONS

"Two-Stage Computational Cost Reduction Algorithm Based on Mahalanobis Distance Approximations," by F. Sun, S. Omachi, N. Kato, H. Aso, S. Kono and T. Takagi, IEEE, Sep. 2000, vol. 2.
"Fast Decoding Techniques for Practical Real-Time Speech Recognition Systems," by J. Suontausta, J. Hakkinen and O. Viikki.
"Fast Likelihood Computation Methods for Continuous Mixture Densities in Large Vocabulary Speech Recognition," by S. Ortmanns, T. Firzlaff and H. Ney.
"Vector Quantization for the Efficient Computation of Continuous Density Likelihoods," by E. Bocchieri, IEEE, 1993.

* cited by examiner

*Primary Examiner* — Michael N Opsasnick
(74) *Attorney, Agent, or Firm* — Alfred A. Fressola; Ware, Fressola, Van Der Sluys & Adolphson LLP

(57) ABSTRACT

A method for determining a set of distortion measures in a pattern recognition process, where a sequence of feature vectors is formed from a digitized incoming signal to be recognized, said pattern recognition being based upon said set of distortion measures. The method comprises comparing (S10) a first feature vector in said sequence with a first number (M1) of templates from a set of templates representing candidate patterns, based on said comparison, selecting (S12) a second number (M2) of templates from said template set, the second number being smaller than the first number, and comparing (S14) a second feature vector only with said selected templates. The method can be implemented in a device for pattern recognition.

30 Claims, 3 Drawing Sheets

DETERMINING DISTORTION MEASURES IN A PATTERN RECOGNITION PROCESS

CROSS-REFERENCE TO RELATED APPLICATIONS

This application claims priority under 35 USC §119 to International Patent Application No. PCT/IB02/00948 filed on Mar. 27, 2002.

FIELD OF THE INVENTION

The present invention relates to a pattern recognition process, where a sequence of feature vectors is formed from a digitized incoming signal, and the pattern recognition is performed for each feature vector based upon a set of distortion measures. More specifically, the invention relates to a method for computing the distortion measures in such a process. The invention also relates to a computer program product for executing such a method, and a device for pattern recognition.

BACKGROUND OF THE INVENTION

In pattern recognition, incoming signals are digitized, and a sequence of feature vectors are formed. These feature vectors are then compared to templates of candidate patterns to be identified in the signal. E.g., in the case of speech recognition, the candidate patterns can represent names in a phonebook.

However, pattern recognition such as speech recognition is computationally demanding. In many cases, for example when implemented in embedded devices, due to the limited amount of memory and computational power there is a need to reduce the complexity of the algorithm.

The computational complexity depends on several factors: the sampling rate of feature vectors, the number of candidate model templates, and the feature vector dimension. Reducing any of these results in faster recognition that can be run in reasonable time on a certain processor, but this also gives poorer recognition accuracy.

Conventional complexity reduction of pattern recognizers, such as speech recognizers, has been addressed by at least the following prior art techniques:

1. Feature vector down sampling
2. Clustering of the model templates
3. Reduction of the feature vector dimension The second technique first clusters the acoustic space off line. Then, during decoding, a quick search among the clusters is performed first, and then only the members of the best matching cluster are evaluated.

An example of such off-line clustering is described in "Fast decoding techniques for practical real-time speech recognition systems", Suontausta J, Hakkinen J, and Viikki O., proc. IEEE workshop on Automatic Speech Recognition and Understanding, Keystone, Colo., Dec. 1999.

According to this method, for a given feature vector, a codebook with a given number of code vectors is introduced, and a sub-set of Gaussian densities to be evaluated is assigned to each code vector. For each feature vector the closest code vector is determined, and its corresponding density sub-set is then used for distortion computations.

This method provides computational savings for similar classification performance, but requires additional parameter data. Due to the required code vector search step and the fact that, usually, the dimension of the feature space is high, the computational savings can be significantly reduced.

SUMMARY OF THE INVENTION

An object of the present invention is thus to provide an improved pattern recognition, allowing for reductions in the required processing power, without unacceptably compromising the accuracy of the recognition process.

According to a first aspect of the invention, this object is achieved with a method of the kind mentioned in the introduction, comprising repeating the following steps:

1. Comparing a first feature vector in said sequence with a large number, preferably all of the templates in the set.
2. Selecting a second number (M2) of templates in the template set based on said comparison, the second number (M2) being smaller than the first number (M1).
3. Comparing a second feature vector with said second number (M2) of templates in the template set.

The proposed method thus uses a selective process on the templates so that, for some feature vectors, only a sub-set of them will be evaluated.

The recognition process, based on the computed distortion measures, is performed after each distortion computing step, i.e. also after the incomplete steps.

It has been established through testing that such a selection can significantly reduce the need for computing distortion measures, with only limited effects on the recognition quality.

The second number (M2) can be dependent upon a distance measure between the first feature vector and the second feature vector. This enables the process to compare a small number of templates, i.e., save computational power, when the feature vectors are similar.

Preferably, the selected templates include the templates obtaining the lowest distortion measures when compared to the first feature vector.

Further, a number of successive feature vectors can be compared with said second number (M2) of templates in the template set. This results in the following process:

1) periodically, the distortion measures for a large number, preferably all of the templates are computed
2) based on step 1, only the best matching templates are selected to be compared with the temporally neighboring feature vectors.

According to one embodiment, the selected templates include a pre-determined number of templates resulting in the lowest distortion measures when compared to said first feature vector. In other words, the same number of top ranking templates is selected each time.

According to another embodiment, all templates within a defined distance from the lowest distortion measure are included in said subset. This can be accomplished for example by including all templates resulting in a distortion measure below a predefined threshold value when compared to said first feature vector The selected templates can also be chosen according to a mixture of the previous two methods, whereby the number of templates to be included is affected by the overall distortion. For example, the distortion to 5-10 closest templates can be used to determine the number of included templates.

For templates not included in said selected templates, distortion measures computed with respect to a different feature vector are included in said set of distortion measures. In other words, if distortion measures for all or a larger number of templates are needed, the ones not computed for the present feature vector can be substituted with distortion measures computed for a different feature vector. By approximating omitted distortion measures in this way, the recognition quality is better preserved. According to one embodiment, only specific components of such previously or future computed distortion measures are used, resulting in a process where components from distortion measures computed with respect to different feature vectors are combined.

The mentioned different feature vector can be either a previously sampled and compared feature vector, or a later sampled and compared feature vector. Preferably, it is the feature vector most recently compared to the first number of templates in the set. Alternatively, it can be the subsequent vector that is compared to the first number of templates in the set. Yet alternatively, both a previous and a following vector can be used in forming the set of substituted distortion measures.

The different feature vector can also be a feature vector compared to the first number of templates from the template set being closest to the current feature vector according to a predefined distance measure, i.e., having a low distortion measure compared to the current feature vector.

The number of successive feature vectors in between each complete comparison can be static or dynamic, depending on the implementation. A dynamic number can for example be combined with a detection of processor load, so as to enable adjustment of the computation load in response to the processor load.

The templates can be Gaussian mixture densities of states in Hidden Markov Models (HMMs). The HMM is a statistical model used in various pattern recognition tasks, i.e. speech recognition, character recognition, gene finding, and image analysis. In this case, the process of recognition may include computing state likelihoods for HMMs with respect to a feature vector.

The signal can further represent speech, and the candidate patterns represent spoken utterances. This implies use of the invention in a speech recognition system, as for example implemented in voice based user interface, e.g., in a phone system. However, the invention in its most general aspect is not limited to such use.

According to a second aspect of the invention, the above object is achieved with a computer program product, stored on a computer readable medium, comprising computer program code portions arranged to, when executed by a computer processor, perform the above mentioned method.

According to a third aspect of the invention, the above object is achieved with a device determining a set of distortion measures in a pattern recognition process, where a sequence of feature vectors is formed from a digitized incoming signal to be recognized, said pattern recognition being based upon said set of distortion measures, comprising means for comparing a first feature vector in said sequence with a first number of templates from a set of templates representing candidate patterns, means for selecting, based on said comparison, a second number of templates from said template set, the second number being smaller than the first number, and means for comparing a second feature vector only with said selected templates.

In particular, such a device can be implemented as an embedded processor comprising a front-end section for forming said sequence of feature vectors, and a back-end section for providing said set of distortion measures.

BRIEF DESCRIPTION OF THE DRAWINGS

These and other aspects of the invention will be apparent from the preferred embodiments more clearly described with reference to the appended drawings.

DETAILED DESCRIPTION OF PREFERRED EMBODIMENTS

In the following description, the pattern recognizing process is a speech recognition process, used in e.g. voice based user interfaces. However, this should not be regarded as a limitation to the invention, which is directed to pattern recognition in general. The incoming signal may be any digitized signal, and the candidate patterns may represent sounds, images, text, handwritten characters, etc.

Figure 1:
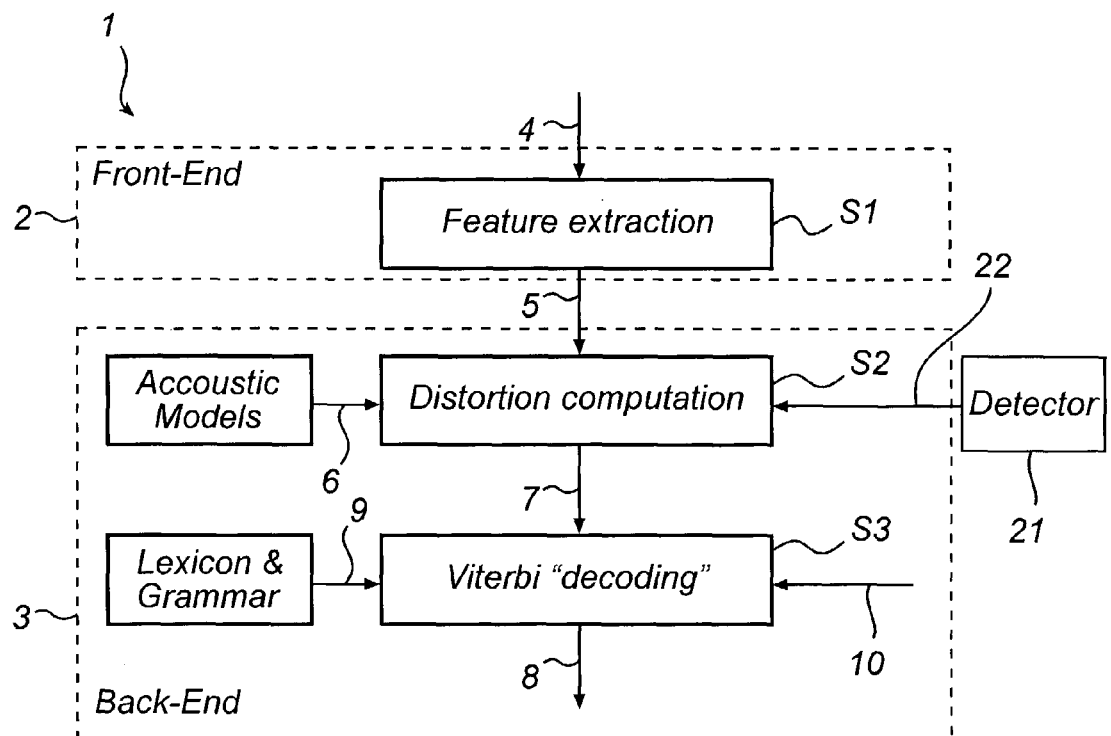
FIG. 1 illustrates a simplified block diagram of a speech recognizer.

A speech recognizer 1 as illustrated in FIG. 1 typically comprises a front-end processing section 2, responsible for the feature extraction, and a back-end processing section 3, responsible for the statistical analysis of extracted features with respect to model templates of candidate words or parts of words. These models can be created by teaching (speaker-dependent name dialing, SDND) or by modeling (speaker-independent name dialing, SIND).

The input to a speech recognizer 1 consists of a digitally sampled waveform 4 split into consecutive, possibly overlapping segments. For each segment three main processing steps are performed:

S1. Feature extraction, producing a vector of features 5.

S2. Computation of the distortion values for the current feature vector compared to the acoustic model templates 6 (in the example below referred to as Gaussian densities), resulting in a distortion table 7 (in the example below referred to as a b-probability table).

S3. Viterbi "decoding", i.e., the current best cumulative distortion values 8 are obtained based on the distortion table computed in step S2. The allowed transitions are constrained by the recognition lexicon plus grammar 9 and the best cumulative distortion values for the previous speech segment 10.

When the speech input ends, the current best recognition hypothesis, as found by the Viterbi decoding step, is typically presented to the user as the recognition result.

Each acoustic model is usually represented by an HMM (Hidden Markov Model). The HMMs are the building blocks for the possible classification outcomes.

The HMM is a statistical automaton, which can accept/generate feature vectors. It consists of a set of states, and a set of allowed transitions between these states. Each transition has an associated probability value. Each state is described by a probability density function (PDF) on the space of feature vectors. The negative log-likelihood given by the state PDF and the feature vector can be also viewed as a distortion measure. Given the current state of the automaton it accepts/generates the current feature vector according to the likelihood given by the current state's PDF and then makes a transition to a new state as constrained by the set of transition probabilities.

The HMM that, during time, results in the smallest aggregate distortion is selected as the recognition result.

One of the most demanding computations consists of evaluating, for every feature vector, the distortion to the states of the recognition models. As mentioned before, this distortion is normally computed as a state likelihood measure, (its value also referred to as "b-probability").

In a typical recognition engine, the PDF of each state is a mixture of a certain number of Gaussian densities (e.g., 8). Each density contains a mean and an inverse standard deviation parameter vector.

During recognition, every incoming feature vector is first matched against the density parameters (mean and standard deviation) of each density, to generate a distortion measure based on a negative log-likelihood value as follows, $$L = C - \sum_{i=1}^{D} (x_i - \mu_i)^2 \cdot istd_i^2, \quad (1)$$

where L is the log-likelihood of the density, $x_i$ is the $i^{th}$ vector component of the feature vector, $\mu_i$ and $istd_i$ denote the $i^{th}$ mean and inverse standard deviation vector component, D represents the number of feature components (the feature vector dimension), and C is an additive constant equal to the logarithm of the product of inverse standard deviations times 1/sqrt(2*pi) to the power of D, where D is the feature vector dimension.

The state b-probability is then given as follows $$b = \log \sum_{i=1}^{M} \exp(W_i + L_i) \quad (2)$$

where $W_i$ and $L_i$ are, respectively, the log-mixture weight and the log-likelihood for density i, M stands for the number of densities in the state and b is the b-probability value.

After calculating the b-probability values for all the states, the results are stored in a so called b-probability table 7, needed by the Viterbi algorithm. This algorithm is used to determine a sequence of HMMs which best matches, in the maximum likelihood sense, the stream of input feature vectors. The algorithm is implemented using a dynamic programming methodology.

The number of multiplications and additions required to compute the b-probability table 7 can be approximated as follows:

multiplications=#all densities*#feature components*2, additions=#multiplications.

Figure 2:
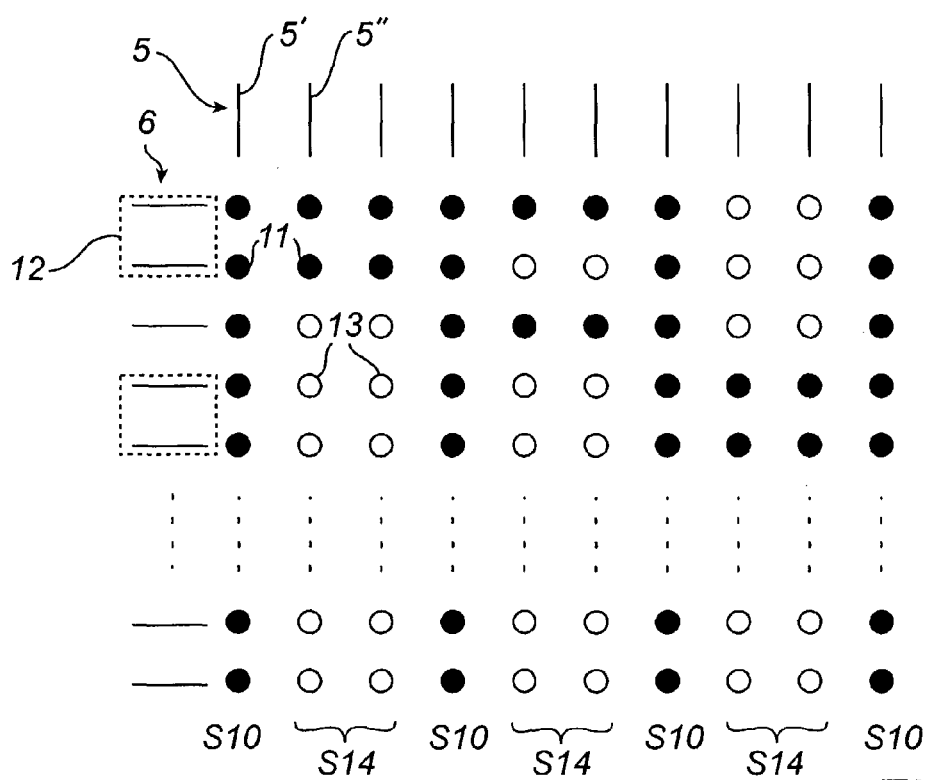
FIG. 2 illustrates a likelihood evaluation process according to a first embodiment of the invention.
Figure 3:
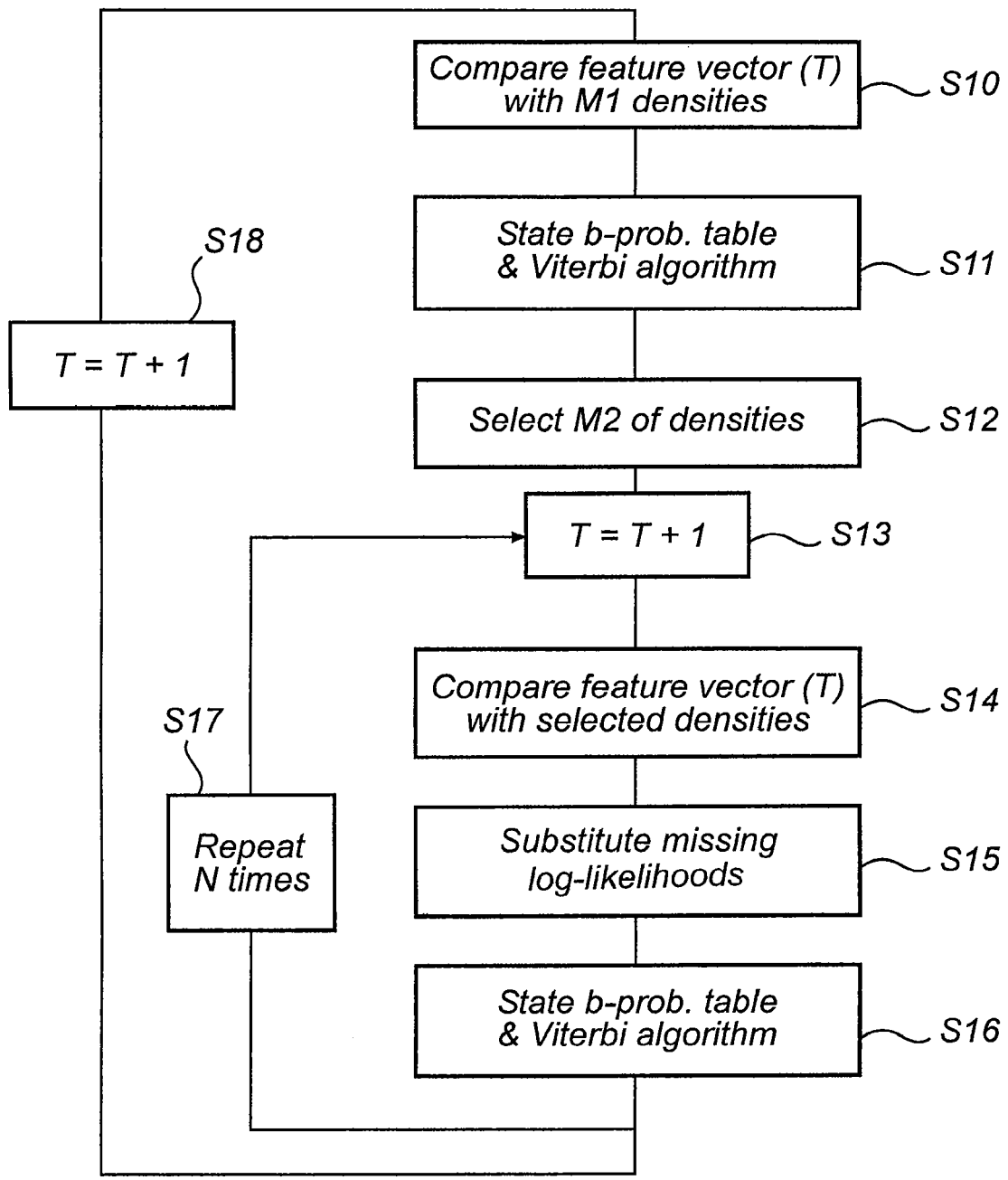
FIG. 3 illustrates a schematic flowchart of the method according to an embodiment of the invention.

With reference to FIGS. 2 and 3, the diagram and flow chart illustrates how each feature vector 5 is compared to a set 6 of densities belonging to different states of a HMM.

First, in step S10, a more extensive evaluation is performed, during which a feature vectors 5' of the current time frame is compared to all or a large number M1 of densities in the set 6, i.e., eq. 1 is calculated for M1 densities (such calculations are represented by dark spots 11 in FIG. 2). Based on the calculated log-likelihoods (L), in step S11 the state b-probabilities are computed, and used by the Viterbi algorithm, as mentioned above. This concludes processing of the feature vector 5'.

In step S12, a number M2 of densities, are selected as a subset 12 from the set 6 of densities. Note that the M2 selected densities 12 can be a subset of the M1 first densities, but this is not necessary. The M2 selected densities may include densities that were not included in the M1 densities. The M2 selected densities 12 may include the best ranking densities from the first comparison in step S10, i.e., those with the lowest distortion measures.

Next, the program control continues with the next time frame, i.e., the time index is incremented in step S13.

In step S14, an incomplete evaluation is performed, where the following feature vector 5" is only compared to the densities 12 selected in step S12, i.e., eq. 1 is only calculated for the subset 12 (omitted calculations are represented by white spots 13 in FIG. 2). As previously mentioned, the subset 12 can comprise the densities that scored the lowest distortion measures in the previous, extensive evaluation S10.

In step S15 the missing log-likelihoods, i.e. the ones relating to omitted calculations 13 in the incomplete comparison S14, can be substituted with log-likelihoods L computed with respect to a different feature vector (past or future). For example, for each particular density, the most recent computed log-likelihood or the likelihood relative to the highest likelihood value, may be used. Alternatively, it can be the subsequent vector that is compared to a large number of templates in the set. Yet alternatively, both a previous and a following vector can be used in forming the set of substituted distortion measures.

It may be also be advantageous to combine contributions from different distortion measures, i.e., using some contributions from a comparison with one feature vector, while using other contributions from a comparison with a different feature vector.

Another possibility is to use distortion measures or contributions from distortion measures computed with respect to a feature vector (past or future) compared to the first number of densities, which feature vector is similar to the current feature vector. Such similarity can be determined by using the same distortion measure computation (eq. 1), or by any other suitable distance measure.

Again, based on the calculated log-likelihoods, in step S16 the state b-probabilities are computed, and used by the Viterbi algorithm, as mentioned above. This concludes processing of the feature vector 5'.

The steps S13-S16 are repeated (step S17) for a number N of temporally following feature vectors, before the program control returns to step S10, and once again performs an extensive evaluation S10 comparing a feature vector with M1 densities, after incrementing the time index in step S18.

Figure 4:
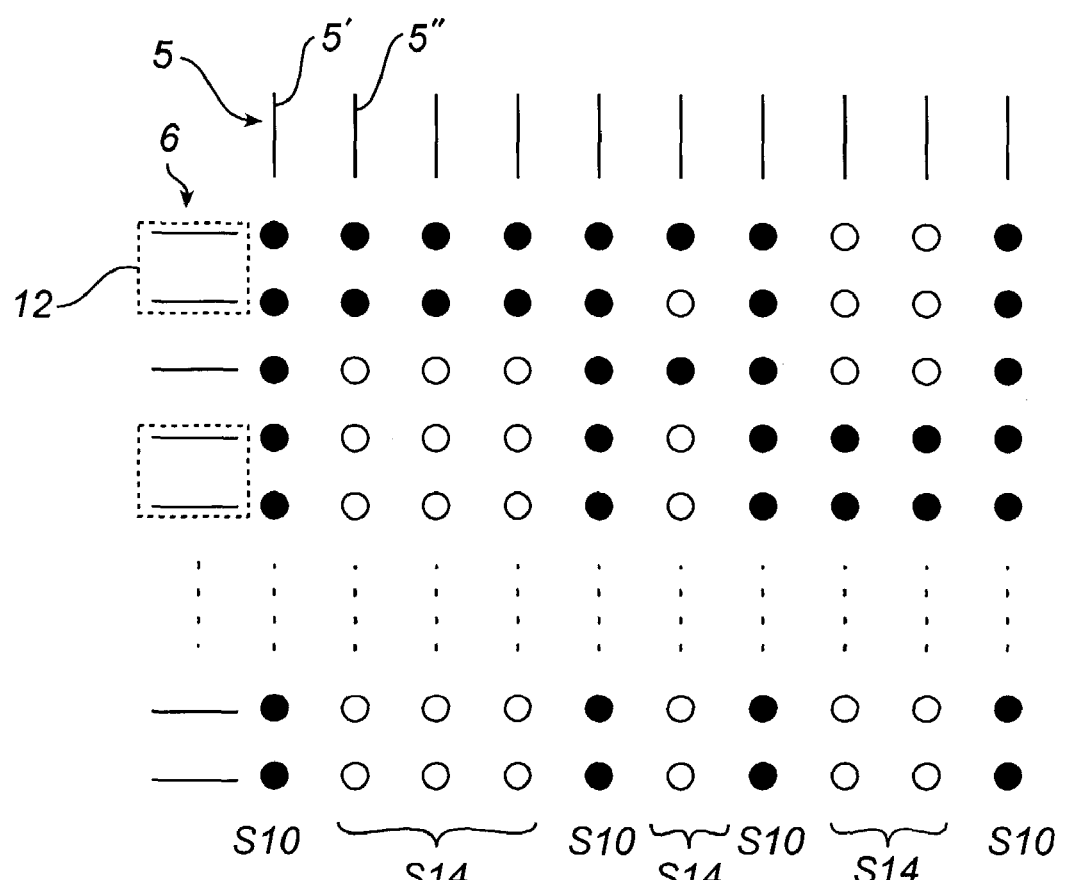
FIG. 4 illustrates a likelihood evaluation process according to a second embodiment of the invention.

The number N of reduced evaluations S14 (two in FIG. 2) in between the extensive evaluations S10 can be determined by the implementation. It can be static as in FIG. 2, or dynamic, in which latter case it can be arranged to adjust to a control signal representing e.g., the processor load or a feature vector similarity/smoothness measure. In FIG. 1, a detector 21 is illustrated to generate such a control signal 22. For example, the processor load can be determined and classified as being in one of three intervals, and the number of incomplete evaluations can vary accordingly, depending on the current processor load interval. An example of this is illustrated in FIG. 4, where the number N of incomplete evaluations S14 is first three, then one and then two.

The process of selecting which M2 densities a feature vector should be compared to, in between the complete evaluations S10, is a matter of design. As mentioned, the selected densities could be the ones having the best log-likelihoods in the preceding extensive comparison.

According to a first approach, the subset 12 of densities includes any density scoring a log-likelihood exceeding a predefined threshold value in the previous, complete evaluation. Therefore, the number M2 of selected densities is allowed to vary.

Another possible approach is to list the resulting log-likelihoods in a relative order, and to select a determined number M2 of densities from the top of the list. This results in the same number of densities M2 in each incomplete comparison S14. Of course, in the case of a constant number M2, this number may in turn be static or dynamic, in the same way as was described with regard to the number N of incomplete evaluations above. It may also depend on the overall distortion as such.

The selection of the second number of densities can also reach outside the first number densities, i.e., not be a subset of these first densities. If, for example, the best ranking densities are on the border of the first number of densities, it may be advantageous to select some of these densities, but to also select some densities immediately outside this border, i.e., not included in the first number of densities. The total number of selected densities 12 can of course again be static or dynamic.

The number (M2) of selected densities may be arranged to depend on the difference between the first feature vector 5', compared to the first number M1 of densities, and the second feature vector 5" compared to the second number M2 of densities. The difference can be established by using a distortion measure according to the above, or any other distance measure. By such a design, the number of compared densities depends on the similarity of the feature vectors.

The above described method can be implemented in the back-end 3 of the speech recognizer in FIG. 1, preferably by providing the back-end processor with software for adopting the step S2 to include an embodiment of the described method. Such software can be stored on a computer readable medium, such as a diskette or a CD, or be distributed over a network such as the Internet.

A number of modifications within the scope of the appended claims will be apparent to the skilled person. For example, alternative ways to compensate the omitted calculations may be envisaged, such as using a predetermined value, interpolating, extrapolating or otherwise estimating them from the already computed (previous or following) distortion measures etc. Further, the number of consecutive complete evaluations can obviously be more than one, if that is called for by the situation.

Finally, and as was mentioned before, the case of speech recognition is only intended as an example of a pattern recognition task where the present invention can be advantageously implemented.

The invention claimed is:

1. A method comprising:
   comparing by a processor a first feature vector in a sequence of feature vectors formed from a digitized incoming signal to be recognized, with a first number of templates from a set of templates representing candidate patterns,
   based on said comparison, selecting by a processor in response to a control signal, a second number of templates from said template set, the second number being smaller than the first number,
   comparing by a processor a second feature vector only with said selected templates, and
   generating by a processor a signal corresponding to a recognized pattern of said digitized incoming signal as a result of said comparing said second feature vector only with said selected templates.

2. A method according to claim 1, wherein said second number is dependent upon a distance measure between said first feature vector and said second feature vector.

3. A method according to claim 1, wherein said selected templates include the templates resulting in the lowest distortion measures when compared to said first feature vector.

4. A method according to claim 1, wherein said selected templates include a pre-determined number of templates resulting in the lowest distortion measures when compared to said first feature vector.

5. A method according to claim 1, wherein said selected templates include all templates resulting in a distortion measure below a predefined threshold value when compared to said first feature vector.

6. A method according to claim 1, wherein a number of successive feature vectors are only compared with said second number of templates in said template set.

7. A method according to claim 1, wherein, for templates not included in said selected templates, distortion measures computed with respect to a different feature vector are included in said set of distortion measures.

8. A method according to claim 1, wherein, for templates not included in said selected templates, specific components of distortion measures computed with respect to a different feature vector are used for determining said set of distortion measures.

9. A method according to claim 7, wherein said different feature vector is the feature vector most recently compared to the first number of templates from the template set.

10. A method according to claim 8, wherein said different feature vector is the feature vector most recently compared to the first number of templates from the template set.

11. A method according to claim 7, wherein said different feature vector is a feature vector compared to the first number of templates from the template set being closest to the current feature vector according to a predefined distance measure.

12. A method according to claim 8, wherein said different feature vector is a feature vector compared to the first number of templates from the template set being closest to the current feature vector according to a predefined distance measure.

13. A method according to claim 1, wherein said number of successive feature vectors is static.

14. A method according to claim 1, wherein said number of successive feature vectors is dynamic.

15. A method according to claim 1, wherein said control signal is based on a time-dependent variable belonging to the group of processor load and incoming signal properties.

16. A method according to claim 1, wherein said templates are Gaussian mixture densities of Hidden Markov Models.

17. A method according to claim 16, wherein said distortion measures are based on log-likelihoods.

18. A method according to claim 16, wherein said pattern recognition includes computing a state likelihood for a Hidden Markov Models with respect to a feature vector.

19. A method according to claim 1, wherein said signal represents speech, and said candidate patterns represent spoken utterances.

20. A computer readable storage medium stored with code which, when executed by a processor, causes an apparatus to determine a set of distortion measures in a pattern recognition process by performing:
   forming a sequence of feature vectors from a digitized incoming signal to be recognized, said pattern recognition being based upon said set of distortion measures,
   comparing a first feature vector with a first number of templates from a set of templates representing candidate patterns,
   based on said comparison, selecting a second number of templates from said template set, the second number being smaller than the first number, comparing a second feature vector only with said selected templates, so as to recognize a pattern of said digitized incoming signal; and generating a signal corresponding to a recognized pattern of said digitized incoming signal as a result of said comparing said second feature vector only with said selected templates.

21. An apparatus comprising:

a distortion computation module configured:

to compare a first feature vector in a sequence of feature vectors formed from a digitized incoming signal to be recognized with a first number of templates from a set of templates representing candidate patterns, to select, based on said comparison, a second number of templates from said template set, the second number being smaller than the first number, to compare a second feature vector only with said selected templates so as to recognize a pattern of said digitized incoming signal; and to generate a signal corresponding to a recognized pattern of said digitized incoming signal as a result of said comparing said second feature vector only with said selected templates.

22. The apparatus according to claim 21, wherein said selected templates include the templates resulting in the lowest distortion measures when compared to said first feature vector.

23. The apparatus according to claim 21, further wherein the distortion computation module is configured to include distortion measures computed with respect to a different feature vector, in said set of distortion measures.

24. The apparatus according to claim 21, wherein said distortion computation module configured to compare said second feature vector is configured to compare a number of successive feature vectors only with said selected templates.

25. The apparatus according to claim 21, further comprising a control module, configured to detect the processor load and to adjust the number of successive feature vectors in response to a said load.

26. A speech recognizer comprising an apparatus according to claim 21.

27. A communication device comprising a speech recognizer according to claim 26.

28. An apparatus for pattern recognition, comprising:

a feature extractor configured to form a sequence of feature vectors from a digitized incoming signal, a pattern recognizer configured to perform a pattern recognition process based upon a set of distortion measures, and a distortion computation module configured:

to compare a first feature vector with a first number of templates from a set of templates representing candidate patterns, to select, based on said comparison, a second number of templates from said template set, the second number being smaller than the first number, to compare a second feature vector only with said selected templates, so as to recognize a pattern of said digitized incoming signal; and to generate a signal corresponding to a recognized pattern of said digitized incoming signal as a result of said comparing said second feature vector only with said selected templates.

29. The apparatus according to claim 28, implemented as an embedded system, comprising:

a front-end section for forming said sequence of feature vectors, and a back-end section for determining said set of distortion measures.

30. An apparatus comprising:

means for comparing a first feature vector in a sequence of feature vectors formed from a digitized incoming signal to be recognized with a first number of templates from a set of templates representing candidate patterns, means for selecting, based on said comparison, a second number of templates from said template set, the second number being smaller than the first number, and means for comparing a second feature vector only with said selected templates, so as to recognize a pattern of said digitized incoming signal; and means for generating a signal corresponding to a recognized pattern of said digitized incoming signal as a result of said comparing said second feature vector only with said selected templates.

* * * * *